United States Patent [19]

Ichimura et al.

[11] 3,944,697

[45] Mar. 16, 1976

[54] GLASS BODY HAVING A FLUORESCENT PATTERN INWARDLY OF A SURFACE THEREOF

[75] Inventors: Takeo Ichimura; Teruo Kaneko, both of Tokyo, Japan

[73] Assignee: Nippon Kogaku K.K., Tokyo, Japan

[22] Filed: May 9, 1973

[21] Appl. No.: 358,467

[52] U.S. Cl. ............... 428/210; 65/30 E; 428/410; 428/913
[51] Int. Cl.² ............... C03C 17/00; C09K 9/00
[58] Field of Search ............... 161/35, 412, 196, 1; 117/33.5 T, 33.5 L, 118, 1.7; 65/30, 33, DIG. 2, 32; 428/913, 410, 210

[56] References Cited
UNITED STATES PATENTS

| | | | |
|---|---|---|---|
| 2,515,275 | 7/1950 | Stookey | 65/DIG. 2 |
| 2,515,937 | 7/1950 | Stookey | 65/DIG. 2 |
| 3,323,926 | 6/1967 | O'Leary | 65/30 |
| 3,419,370 | 12/1968 | Cramer et al | 117/118 |

Primary Examiner—Mayer Weinblatt
Assistant Examiner—Edith R. Buffalow
Attorney, Agent, or Firm—Fitzpatrick, Cella, Harper & Scinto

[57] ABSTRACT

A glass body having a fluorescent pattern inwardly of a surface thereof is formed by depositing a first material in a predetermined pattern on a surface of glass containing readily ion-exchangeable first ions, the first material containing second ions capable of ion-exchange with the first ions, one of the glass and the first material containing ions for providing a fluorescence center, and by causing the second ions to penetrate into the glass through ion-exchange with the first ions so that the fluorescence-center providing ions may be distributed in a pattern which is in positive or negative relationship with the predetermined pattern.

9 Claims, 8 Drawing Figures

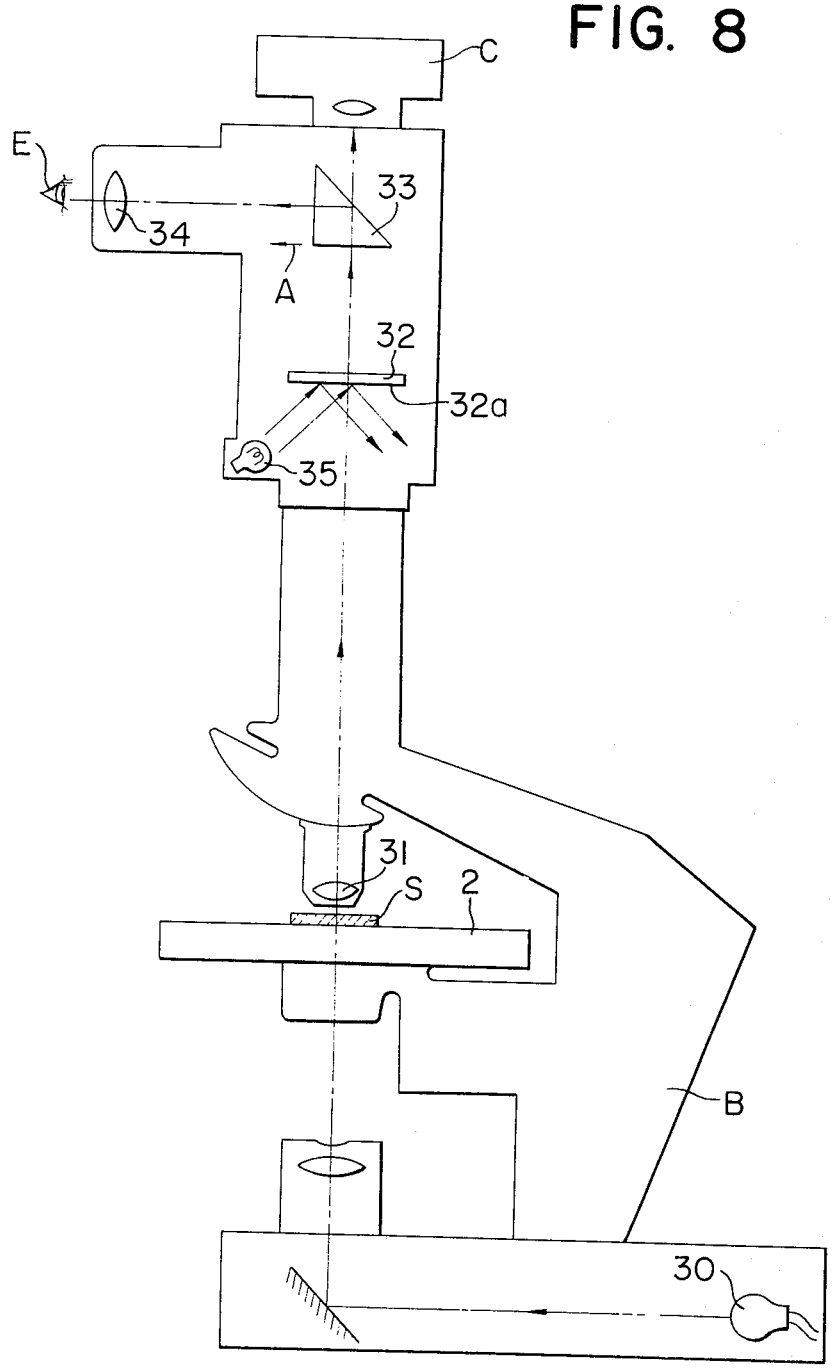

GLASS BODY HAVING A FLUORESCENT PATTERN INWARDLY OF A SURFACE THEREOF

BACKGROUND OF THE INVENTION

1. Field of the Invention

This invention relates to optical elements, and more particularly to a glass body having a fluorescent pattern for use in optical instruments, for example, the fluorescent pattern existing inwardly of a surface of the glass body, and to a method of making such glass body.

2. Description of the Prior Art

Glass bodies having a graticule, reticule, grating, character, symbol or other pattern formed on a surface thereof have been widely used with various optical instruments. These patterns have heretofore been formed either by applying a pigment on a surface of a glass body or by engraving the surface of the glass body through one of several various techniques to provide recesses in such surface, and then filling the recesses with a pigment. The pattern thus formed is always exposed outwardly of the surface of the glass body, and accordingly tends to reduce the amount of light transmissive through the glass or to obstruct the field of view.

To eliminate these disadvantages, there has already been proposed a method whereby a pattern is formed on a surface of a glass body by using a fluorescent dye or pigment which is normally transparent, but which, when irradiated with exciting radiations, can produce a color. The pattern provided by such method overcomes the above-noted disadvantages in that it appears only when irradiated with exciting radiations, but is otherwise invisible, thus to maintain the glass body transparent. However, the fluorescent dye or pigment used for the pattern is always exposed so that the pattern formed thereby is susceptible to chemical and physical destruction or injury. If, in an effort to overcome these disadvantages, the surface of the glass body coated with the fluorescent dye or pigment is covered with a separate film of glass, not only the capacity of fluorescence but also the configurational accuracy of the pattern would be so severely reduced that such glass body would lose its usefulness for fine measuring instruments.

SUMMARY OF THE INVENTION

We have conceived a glass body having a fluorescent pattern inwardly of a surface thereof, by which we are able to eliminate all the disadvantages noted above. More specifically, we contribute a glass body having a predetermined fluorescent pattern formed inwardly of a surface thereof by causing ions for providing a fluorescence center or ions for blocking the fluorescence of a fluorescent material to penetrate into the glass through the process of ion-exchange. We also provide a method of making such glass body.

BRIEF DESCRIPTION OF THE DRAWINGS

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification wherein:

FIG. 8 schematically shows a microscope which has incorporated therein the glass body having a fluorescent pattern according to the present invention.

DESCRIPTION OF THE PREFERRED EMBODIMENTS

The principle underlying the present invention consists in causing certain ions to penetrate into the interior of a glass body containing readily ion-exchangeable ions through the exchange of ions therebetween so that the distribution of the penetrant ions may form a predetermined pattern inwardly of the surface of the glass body, thereby causing a fluorescent pattern corresponding to the predetermined pattern formed inwardly of the glass surface. When used with optical instruments, the glass body will take the shape of a plate, wedge, prism or lens, for example, but these shapes are not limiting or restrictive. The surface through which the ions penetrate should desirably be a smooth surface polished by a conventional mechanical, thermal or chemical process.

The invention will hereinafter be described in detail with respect to two embodiments thereof.

A first embodiment of which penetrant ions provide a fluorescence center will first be considered. The readily ion-exchangeable ions contained in the glass are those containing one or more types of alkali metal ions or positive monovalent ions. Alternatively, divalent or other multivalent ions which are readily reducible into positive monovalent ions may be used. The ions which can readily penetrate into the glass through the ion-exchange process may suitably be gold, silver or thallium ions which are positive monovalent ions and provide a fluorescence center. The ion-penetration may be achieved by metal film vapor phase oxidation, metal film field oxidation, chemical pasting, dipping in molten salt, or ion implantation, etc.

Figure 1:
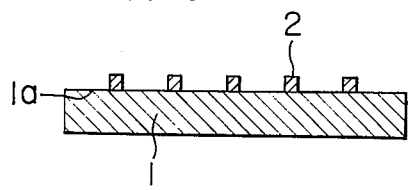
FIG. 1 is a cross-sectional view of a first embodiment of the present invention and showing the manner in which a material for providing a fluorescence center when it has penetrated into glass is disposed on a surface of a glass body.
Figure 2:
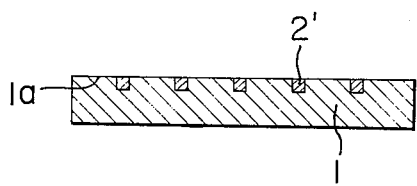
FIG. 2 is a corss-sectional view showing the stage at which the material for providing a fluorescence center has penetrated into the glass.

Referring to FIG. 1, a transparent glass body 1 containing sodium oxide therein has a smooth surface 1a, on which a desired pattern of silver film 2 is formed through vacuum evaporation by the use of a masking plate (not shown) which is in negative relationship with a desired fluorescent pattern to be formed. Subsequently, the glass body 1 with the silver film 2 so deposited thereon is placed in an atmosphere containing 0.5 to 5% by weight of sulphur trioxide, and heated at 200° to 450°C for 15 to 90 minutes. As a result, the silver is oxidized and activated to form silver ions, which exchange with the sodium ions in the glass body 1 thereby to penetrate into the glass. At this stage, some of the silver ions are reduced into silver atoms. In FIG. 2, numeral 2' designates the regions of the glass body in which the penetrant silver ions and the silver atoms are present. When the glass body 1, as shown in FIG. 2, is irradiated with exciting radiations such as ultraviolet rays, the silver ions and silver atoms will provide a fluorescence center so that only the regions 2' will emit fluorescence.

The glass body 1 may also be formed of a material containing potassium oxide, lithium oxide or the like instead of sodium oxide. In these cases, of course, potassium or lithium ions which are alkali metal ions are ion-exchanged. Also, the silver may be substituted for by a metal such as gold, copper or thallium which is oxidizable to form mono-valent ions.

The formation of the metal film on the glass body 1 may be accomplished by the use of a masking plate and not only through vacuum evaporation but also through sputtering, chemical plating or other suitable techniques. Alternatively, the metal film may be formed over the entire surface area of the glass body 1 through any one of the above-mentioned various techniques, whereafter the film may be made into a desired pattern by a suitable etching technique.

If the temperature at which the silver film is heated in the atmosphere of sulphur trioxide exceeds 450°C, the silver ions which have already penetrated into the glass might be reduced and colored, and temperatures below 200°C would wastefully increase the treatment time and are therefor impractical.

Oxidation-penetration with a copper film is more difficult to effect than with a silver film and in addition, the copper ions that have penetrated are less reducible. For these reasons, heating temperatures in the range of 300° to 450°C are suitable for copper.

For a thallium film, the heating temperature may suitably range from 250° to 350°C.

There follows an example of an experiment in which the metal film provided on the glass body as shown in FIG. 1 is caused to effect ion-penetration by field heating.

In the case of a soda lime glass plate having a thickness of 1.2 mm. and having a desired pattern of silver film formed on one surface thereof, electrodes are provided on the opposite sides of the glass plate and a voltage of 120 V is applied to these electrodes with the electrode adjacent the silver film as the positive pole, while the glass plate is heated at 350°C for 15 minutes. As a result, silver ions moderately penetrate into the glass plate to form a fluorescent pattern. Such field heating is meritorious in that the heating temperature can be reduced with less possibility of the penetrant ions being reduced and colored, that the treatment time can be shorter, and that a delicate fluorescent pattern can be formed. When used with the resist technique, the field heating can provide a pattern of 2-micron line width.

According to the embodiment described above, the metal ions penetrate into the glass body to provide a fluorescence center, whereas a second embodiment will next be described in which a glass body containing ions for providing a fluorescence center is penetrated by certain other ions which act to extinguish the fluorescence thereby to form a fluorescent pattern.

In the second embodiment, the glass body contains ions for providing a fluorescence center, i.e. ions having an incomplete $f$-electron shell such as europium (III) $Eu^{3+}$, terbium (III) $Tb^{3+}$ or uranyl $UO_2^{2+}$; ions having an incomplete $d$-electron shell such as manganese (II) $Mn^{2+}$ or chromium (III) $Cr^{3+}$; ions having a complete $s^2$-electron shell such as bismuth (III) $Bi^{3+}$, antimony (III) $Sb^{3+}$, lead (II) $Pb^{2+}$, tin(II) $Sn^{2+}$, indium (I) $In^+$ or gallium (I) $Ga^+$; or ions having a complete $d^{10}$-electron shell such as copper (I) $Cu^=$, silver (I) $Ag^+$ or gold (I) $Au^+$. The glass body also contains therein alkali ions which are readily ion-exchangeable, as in the case of the first embodiment. Therefore, such glass body produces fluorescence when irradiated with ultraviolet rays, visible rays in a certain wavelength range, X-rays or other radiations.

Further, ions which should penetrate into the interior of the fluorescent glass through ion-exchange can readily penetrate thereinto and thereafter can extinguish the fluorescence.

Such penetrant ions may suitably be gold, silver, copper or thallium ions. In the first embodiment, the gold, silver, copper or thallium ions were monovalent ions for providing the fluorescence center, whereas, in the second embodiment, these ions may be made to act as an extinction center for negating the luminescence of those fluorescence-center providing ions in the fluorescent glass, by suitably selecting and combining the composition of the glass, the density of the penetrant ions, and their existential conditions.

The ion penetration may be accomplished by the same technique as that employed in the first embodiment, such as metal film vapor phase oxidation, metal film field oxidation, chemical pasting, dipping in molten salt, or ion implantation.

Figure 4:
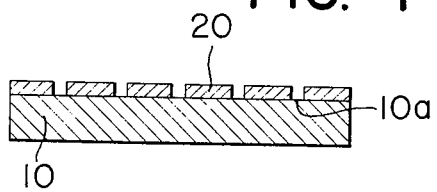
FIG. 4 is a cross-sectional view of a second embodiment of the present invention and showing the manner in which a material for blocking the fluorescence of the material for providing the fluorescence center (hereinafter referred to as "material for providing an extinction center") is disposed on a surface of a fluorescent glass body.
Figure 5:
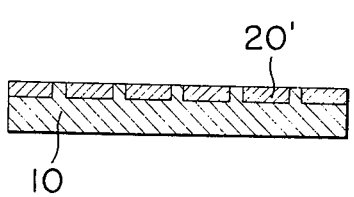
FIG. 5 is a cross-sectional view showing the stage at which the material for providing an extinction center has penetrated into the glass.
Figure 3:
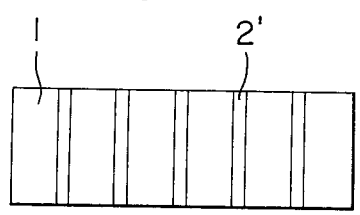
FIG. 3 is a plan view corresponding to FIG. 2.
Figure 6:
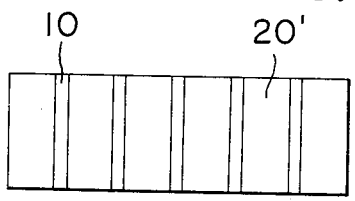
FIG. 6 is a plan view corresponding to FIG. 5.

The second embodiment will now be described with reference to FIGS. 4, 5 and 6.

The fluorescent glass comprises a glass substrate formed of 45% silicon oxide ($SiO_2$), 13% boron oxide ($B_2O_3$), 2% aluminum oxide ($Al_2O_3$), 10% sodium oxide ($Na_2O$), 5% potassium oxide ($K_2O$), 15% barium oxide (BaO) and 10% zinc oxide (ZnO), all percentages being by weight, and 0.2% by weight of uranium oxide ($UO_3$) added to the glass substrate, this being the percentage of an increase to a gross amount. Herein, the uranium present in the state of uranyl $UO_2^{2+}$ provides the fluorescence center and the alkali ions of sodium and potassium are the ions which are to be ion-exchanged with the penetrant ions. In FIG. 4, such a fluorescent glass 10 has a surface 10a, on which silver is deposited through vacuum evaporation with the glass surface 10a being masked by a masking plate having a pattern similar to a desired fluorescent pattern (i.e. a pattern which is in positive relationship with the fluorescent pattern), whereby there is formed a silver film 20 having a negative pattern with respect to the desired pattern.

Alternatively, a silver film may be formed over the entire surface 10a of the glass, whereafter it may be treated by the resist technique so as to leave a negative pattern of silver film 20.

Subsequently, the glass with the silver film 20 so deposited thereon is placed in an atmosphere containing 0.5 to 5% by weight of sulpher trioxide, and heated therein at 200° to 450°C for 15 to 90 minutes, whereby the silver is oxidized and activated to form silver ions, which in turn effect ion-exchange with the alkali ions in the glass 10 thereby to penetrate into the glass body. In FIG. 5, numeral 20' designates the regions of the glass body in which the penetrant silver ions are present. FIG. 6 is a plan view corresponding to FIG. 5. The conditions of the treatment for such ion penetration are determined by the composition of the glass and the amount of the pentrant ions. Any inappropriate conditions would cause the pentrant silver ions to be reduced and aggregate into a coloidal, colored form which deteriorates the performance of the fluorescent pattern.

When the ion-penetrated surface of the glass thus provided is irradiated with exciting radiations such as ultraviolet rays, the regions of the glass body which are free of the silver ion penetration will produce fluorescence while the ion-penetrated regions 20' will produce no fluorescence because in these regions 20' the ultraviolet rays are only absorbed through the coation between those ions for providing the fluorescence center and those silver ions providing the extinction center. Thus, only the regions free of the silver ion penetration will form a bright pattern upon exposure to the ultraviolet rays. The glass looks transparent except during the exposure to the ultraviolet rays.

There follows the result of a test carried out by using the field heating technique to effect ion-penetration in the second embodiment.

By using any one of the aforesaid various techniques, a silver film of a pattern which is in a negative relationship with a desired fluorescent pattern is formed on a surface of a body composed of fluorescent glass containing therein lead ions for providing a fluorescence center and readily ion-exchangeable sodium ions, e.g. glass composed of 67% $SiO_2$, 16% $Na_2O$, 13% PbO and ZnO, all percentages being by weight. A positive electrode is provided on that side of the glass body on which the silver film has been deposited, and a negative electrode is provided on the other side of the glass body, whereafter the glass body is heated. In case of glass having a thickness of 1.2 mm, the heating was continued at 240°C for 20 minutes with a voltage of 90 V applied, whereupon the silver ions penetrated to a depth of about 5 to 10 microns into the interior from the surface of the glass body.

Figure 7:
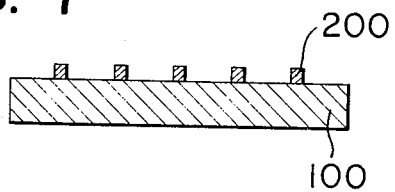
FIG. 7 is a cross-sectional view showing a modification of the second embodiment.

In the second embodiment, the ion-penetration may alternatively be accomplished by forming on a surface of a lead-containing glass body 100 (FIG. 7), a coating 200 of tin oxide in positive relationship with a desired fluorescent pattern, thereafter heating the glass in an atmosphere of gasified cuprous bromide to cause copper ions to penetrate into the regions of the glass which are not covered with the tin oxide. In this case, the heating must be continued at about 400°C for about 1 hour.

FIG. 8 schematically illustrates an application to a microscope of the glass having a fluorescent pattern formed by any one of the various methods described above. Light from a source of visible light 30 provided in the body B of the microscope travels through a necessary optical system to a sample S resting on a support table 2. The support table is freely movable vertically and horizontally. A transparent glass member 32, which has a fluorescent pattern in the form of a graticule or reticule, is disposed in the focal plane of the objective 31 of the microscope. Thus, the image of the sample S is formed on the glass 32 through the objective 31. The formed image of the sample S can be seen by a viewer E through a prism 33 and an eyepiece 34. The formed image can also be recorded with the aid of a camera C by moving the prism 33 in the direction of arrow A away from the optical path extending through the microscope to the camera. An ultraviolet lamp 35 is disposed so as to irradiate the surface 32a of the glass 32 which is formed with the fluorescent pattern.

The use of the microscope will now be described. When the light source 30 is turned on with the lamp 35 turned off, the viewer E can see only the image of the sample S and the fluroescent pattern on the glass does not appear in his field of view. Therefore, the viewer E can freely select any desired portion of the sample S by moving the support table 2. Thereafter, the lamp 35 is turned on, whereupon the fluorescent pattern appears in the field of view so that the viewer E can determine the size or the position of the desired portion of the sample in accordance with the scale provided by the fluorescent pattern.

The fluorescent glass provided by the present invention causes its fluorescent pattern to appear only when it is irradiated with exciting radiations, and the fluorescent pattern has a great mechanical or chemical resistance because it is formed inwardly of the glass surface.

We believe that the construction and operation of our novel contribution will now be understood and that its advantages will be fully appreciated by those persons skilled in the art.

We claim:

1. A normally transparent glass body which exhibits fluorescence in a desired pattern inwardly of a surface thereof when subjected to ultraviolet radiations, which consists essentially of a fluorescent silicate glass containing ions for providing a fluorescent center, alkali metal ions which are ion-exchangeable and
   ions for providing an extinction center present in said glass body in areas other than those of said desired pattern and extinguish the fluorescent properties of said ions for providing a fluorescent center,
   said ions for providing an extinction center having been penetrated into said glass body from said surface through ion-exchange with said alkali metal ions, whereby, when subjected to ultraviolet radiations said glass body exhibits fluorescence in a desired pattern in those areas not containing said other ions.

2. The glass body of claim 1 wherein said ions for providing a fluorescent center are at least one member selected from the group consisting of ions having an incomplete $f$-electron shell, ions having an incomplete $d$-electron shell, ions having a complete $S^2$-electron shell, and ions having a complete $d^{10}$-electron shell; and wherein said ions for providing an extinction center are at least one member selected from the group consisting of gold, silver, copper and thallium ions.

3. The glass body of claim 2 wherein said ions for providing fluorescent center are selected from the group consisting of $Eu^{+3}$, $Tb^{+3}$, $UO_2^{+2}$, $Mn^{+2}$, $Cr^{+3}$, $Bi^{+3}$, $Sb^{+3}$, $Pb^{+2}$, $Sn^{+2}$, $In^{+1}$, $Ga^{+1}$, $Cu^{+2}$, $Ag^{+1}$, and $Au^{+1}$.

4. The glass body of claim 2 wherein said desired pattern is a positive pattern.

5. The glass body of claim 2 wherein the surface from which said other ions are penetrated into said glass body is a smooth surface.

6. The glass body of claim 2 wherein said other ions are present only in the surface region of said glass body.

7. The glass body of claim 6 wherein the depth of penetration of said other ions from said surface is from 5 to 10 microns.

8. A normally transparent glass body which exhibits fluorescence in a positive pattern in a region extending inwardly from a surface thereof when subjected to ultraviolet radiations, which consists essentially of a fluorescent silicate glass containing alkali metal ions which are ion-exchangeable, ions for providing a flourescent center, which are at least one member selected from the group consisting of ions having an incomplete $f$-electron shell, ions having an incomplete $d$-electron shell, ions having a complete $S^2$-electron shell, and ions having a complete $d^{10}$-electron shell; and ions for providing an extinction center present only in said region of said glass body in areas other than those of said desired pattern, extinguish the fluorescent properties of said ions for providing a fluorescent center and are at least one member selected from the group consisting of silver, gold, copper and thallium ions, said ions for providing an extinction center having been penetrated into said glass body from said surface through ion-exchange with said alkali metal ions, whereby when subjected to ultraviolet radiations, said glass body exhibits fluorescence in a positive pattern in those areas not containing said ions for providing an extinction center.

9. The glass body of claim 8 wherein said fluorescence producing ions are selected from the group consisting of $Eu^{+3}$, $Tb^{+3}$, $UO_2^{+2}$, $Mn^{+2}$, $Cr^{+3}$, $Bi^{+3}$, $Sb^{+3}$, $Pb^{+2}$, $Sn^{+2}$, $In^{+1}$, $Ga^{+1}$, $Cu^{+2}$, $Ag^{+1}$, and $Au^{+1}$.

* * * * *

UNITED STATES PATENT OFFICE
CERTIFICATE OF CORRECTION

Patent No. 3,944,697      Dated March 16, 1976

Inventor(s) TAKEO ICHIMURA, et al.

It is certified that error appears in the above-identified patent and that said Letters Patent are hereby corrected as shown below:

First page, bibliographic data, below "[21] Appl. No.: 358,467", insert the following:

-- [30]      Foreign Application Priority Data

May 12, 1972    Japan .................. 47-46482
        May 12, 1972    Japan .................. 47-46483 --

Signed and Sealed this

Sixth Day of July 1976

[SEAL]

*Attest:*

RUTH C. MASON
*Attesting Officer*

C. MARSHALL DANN
*Commissioner of Patents and Trademarks*